United States Patent
Venkata et al.

(10) Patent No.: US 12,389,412 B2
(45) Date of Patent: Aug. 12, 2025

(54) UPLINK CONFIGURED GRANT MANAGEMENT

(71) Applicant: Meta Platforms Technologies, LLC, Menlo Park, CA (US)

(72) Inventors: Madhusudan Kinthada Venkata, South San Diego, CA (US); Shivank Nayak, Milpitas, CA (US); Abhishek Bhatnagar, South San Diego, CA (US); Ping Wang, Redmond, WA (US); Achaleshwar Sahai, San Jose, CA (US); Xiaodi Zhang, San Ramon, CA (US); Swaminathan Balakrishnan, Los Gatos, CA (US)

(73) Assignee: Meta Platforms Technologies, LLC

( * ) Notice: Subject to any disclaimer, the term of this patent is extended or adjusted under 35 U.S.C. 154(b) by 597 days.

(21) Appl. No.: 17/740,011

(22) Filed: May 9, 2022

(65) Prior Publication Data

US 2024/0080848 A1  Mar. 7, 2024

(51) Int. Cl.
  *H04L 1/00*   (2006.01)
  *H04W 72/23*  (2023.01)
  *H04W 80/02*  (2009.01)

(52) U.S. Cl.
  CPC .......... *H04W 72/23* (2023.01); *H04L 1/0008* (2013.01); *H04W 80/02* (2013.01)

(58) Field of Classification Search
  CPC ..... H04W 72/23; H04W 80/02; H04W 72/21; H04W 76/19; H04L 1/0008; H04L 5/0044
  See application file for complete search history.

(56) References Cited

U.S. PATENT DOCUMENTS

| | | | |
|---|---|---|---|
| 2018/0309544 A1* | 10/2018 | Hwang | H04W 72/23 |
| 2019/0021085 A1* | 1/2019 | Mochizuki | H04W 76/27 |
| 2019/0200414 A1* | 6/2019 | Abraham | H04W 76/27 |
| 2019/0289618 A1* | 9/2019 | Dudda | H04L 1/1657 |
| 2020/0359330 A1 | 11/2020 | Zacharias et al. | |
| 2020/0367182 A1* | 11/2020 | Zou | H04W 56/001 |
| 2021/0112559 A1* | 4/2021 | Ou | H04W 72/53 |
| 2022/0150938 A1* | 5/2022 | Wang | H04W 56/001 |
| 2022/0322419 A1* | 10/2022 | Jeon | H04W 72/21 |
| 2023/0014946 A1 | 1/2023 | Sambhwani et al. | |
| 2023/0097142 A1* | 3/2023 | Alfarhan | H04B 17/318 370/329 |

(Continued)

OTHER PUBLICATIONS

International Search Report and Written Opinion for International Application No. PCT/US2023/021590, mailed Aug. 11, 2023, 10 pages.

(Continued)

*Primary Examiner* — Andrew Lee

(74) *Attorney, Agent, or Firm* — FOLEY & LARDNER LLP

(57) ABSTRACT

Disclosed herein are related to a communication device. In one aspect, the communication device includes a wireless interface and a processor coupled to the wireless interface. In one aspect, the processor is configured to determine an absence of content data remaining to transmit to a base station for an uplink configured grant, and cause the wireless interface to bypass transmission of a padding data for the uplink configured grant, responsive to the absence of the content data remaining for the uplink configured grant.

15 Claims, 5 Drawing Sheets

(56) References Cited

U.S. PATENT DOCUMENTS

2024/0322979 A1\* 9/2024 Marinier ............... H04L 1/1861
2024/0357465 A1\* 10/2024 Fujishiro ............... H04W 40/22
2024/0381132 A1\* 11/2024 Freda .................... H04L 1/1812

OTHER PUBLICATIONS

Sequans Communications., "Considerations on Skipping UL Padding Transmissions," 3GPP Draft, Apr. 11, 2016, 7 pages.

\* cited by examiner

400

UPLINK CONFIGURED GRANT MANAGEMENT

FIELD OF DISCLOSURE

The present disclosure is generally related to wireless communication, including but not limited to selectively managing or omitting uplink transmissions for uplink configured grants.

BACKGROUND

Cellular communication technology (e.g., 3G, 4G, 5G) allows high data rate communication. In one example, user equipment (UE) may transmit data to or receive data from a base station. In general, a base station provides an uplink configured grant (UL CG) to UE to allow uploading/sending data by the UE. The UL CG may specify channel information such as resource block (RB), frequency bands, time periods, modulation coding schemes (MCS), data size, etc. However, allowing uplink based on a number of UL CGs may be inefficient, when the uplink data varies dynamically. For example, a device (or UE) may receive audio data or image data of augmented reality or virtual reality. The audio data or image data may be generated or updated, according to a location and a gaze direction of the device, and may dynamically change or be reduced/absent depending on the movement of the device. Communication of such dynamically changing data of the augmented reality or the virtual reality based on a fixed number of UL CGs may be inadequate or inefficient.

SUMMARY

Various embodiments disclosed herein are related to a communication device. In some embodiments, the communication device includes a wireless interface and a processor coupled to the wireless interface. In some embodiments, the processor is configured to determine an absence of content data remaining to transmit to a base station for an uplink configured grant, and cause the wireless interface to bypass transmission of padding data for the uplink configured grant, responsive to the absence of the content data remaining for the uplink configured grant.

In some embodiments, the processor is configured to determine additional content data to transmit for another uplink configured grant, and cause the wireless interface to transmit, to the base station, the additional content data for the another uplink configured grant. In some embodiments, the processor is configured to append, to the additional content data, an indicator indicating an end of the additional content data. In some embodiments, the base station receiving the indicator is configured to bypass determining an absence of receiving the padding data for the uplink configured grant, as a radio link failure, in response to the indicator. In some embodiments, the processor is configured to determine an amount of bypassing of transmissions for uplink configured grants, and compare the amount of bypassing of transmissions against a threshold value. In some embodiments, the processor is configured to cause the wireless interface to bypass the transmission of the padding data, responsive to the absence of the content data remaining for the uplink configured grant, and to the amount of bypassing of transmissions being less than the threshold value. In some embodiments, the processor is configured to determine an amount of content data allocated for the another uplink configured grant. In some embodiments, the processor is configured to add padding data to the additional content data to meet the amount of content data allocated for the another uplink configured grant.

In some embodiments, the processor is configured to determine the absence of the content data remaining to transmit to the base station for the uplink configured grant by determining that a media access control protocol data unit (MAC PDU) of the uplink configured grant includes an amount of null data meeting a threshold amount.

Various embodiments disclosed herein are related to a method of communication. In some embodiments, the method includes determining, by a user equipment (UE), an absence of content data remaining to transmit to the base station for an uplink configured grant. In some embodiments, the method includes bypassing, by the UE, transmission of padding data for the uplink configured grant, responsive to the absence of the content data remaining for the uplink configured grant.

In some embodiments, the method includes determining, by the UE, additional content data to transmit for another uplink configured grant. In some embodiments, the method includes transmitting, by the UE to the base station, the additional content data for the another uplink configured grant. In some embodiments, the method includes appending, by the UE to the additional content data, an indicator indicating an end of the additional content data. In some embodiments, the base station receiving the indicator bypasses determining an absence of receiving the padding data for the uplink configured grant, as a radio link failure, in response to the indicator. In some embodiments, the method includes determining, by the UE, an amount of bypassing of transmissions for uplink configured grants. In some embodiments, the method includes comparing, by the UE, the amount of bypassing of transmissions against a threshold value. In some embodiments, the UE bypasses the transmission of the padding data, responsive to the absence of the content data remaining for the uplink configured grant, and to the amount of bypassing of transmissions being less than the threshold value. In some embodiments, the method includes determining, by the UE, an amount of content data allocated for the another uplink configured grant, and adding, by the UE, padding data to the additional content data to meet the amount of content data allocated for the another uplink configured grant.

In some embodiments, determining, by the UE, the absence of the content data remaining for the uplink configured grant includes determining, by the UE, that a media access control protocol data unit (MAC PDU) of the uplink configured grant includes an amount of null data meeting a threshold amount.

Various embodiments disclosed herein are related to a non-transitory computer readable medium storing instructions for communication. In some embodiments, the non-transitory computer readable medium stores instructions when executed by one or more processors cause the one or more processors to determine, an absence of content data remaining to transmit to a base station for an uplink configured grant, and cause a wireless interface to bypass transmission of padding data for the uplink configured grant, responsive to the absence of the content data remaining for the uplink configured grant.

In some embodiments, the non-transitory computer readable medium stores instructions when executed by the one or more processors cause the one or more processors to determine additional content data to transmit for another uplink configured grant, and cause the wireless interface to transmit, to the base station, the additional content data for the another uplink configured grant.

In some embodiments, the non-transitory computer readable medium stores instructions when executed by the one or more processors cause the one or more processors to append, to the additional content data, an indicator indicating an end of the additional content data. In some embodiments, the base station receiving the indicator bypasses determining an absence of receiving the padding data for the uplink configured grant as a radio link failure, in response to the indicator. In some embodiments, the non-transitory computer readable medium stores instructions when executed by the one or more processors cause the one or more processors to determine an amount of bypassing of transmissions for uplink configured grants, and compare the amount of bypassing of transmissions against a threshold value. In some embodiments, the one or more processors may cause the wireless interface to bypass the transmission of the padding data, responsive to the absence of the content data remaining for the uplink configured grant, and to the amount of bypassing of transmissions being less than the threshold value. In some embodiments, the non-transitory computer readable medium stores instructions when executed by the one or more processors cause the one or more processors to determine an amount of content data allocated for the another uplink configured grant, and to add padding data to the additional content data to meet the amount of content data allocated for the another uplink configured grant.

In some embodiments, the instructions when executed by the one or more processors that cause the one or more processors to determine the absence of the content data remaining to transmit to the base station for the uplink configured grant include instructions when executed by the one or more processors cause the one or more processors to determine that a media access control protocol data unit (MAC PDU) of the uplink configured grant includes an amount of null data meeting a threshold amount.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
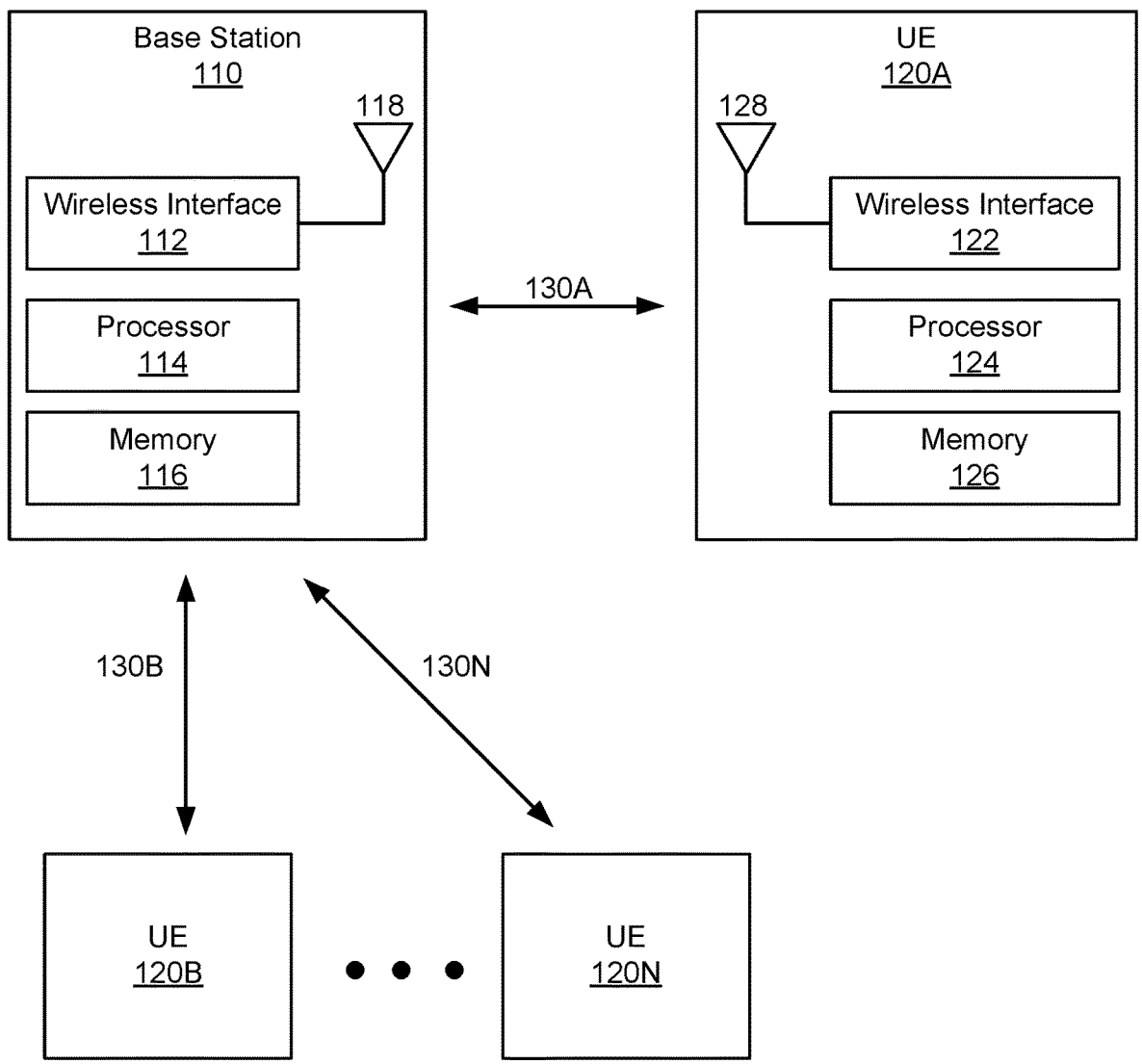
FIG. 1 is a diagram of an example wireless communication system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to selectively providing uplink transmission for a cellular communication (e.g., 3G, 4G, 5G). In one aspect, a user equipment (UE) or a communication device determines an absence of content data (e.g., remaining from an existing/current traffic stream that has used one or more earlier/other uplink configured grants) to transmit to a base station for/using an (e.g., next/current) uplink configured grant (UL CG). The content data may be data containing content, such as text, audio, video, or miscellaneous information. The UL CG may specify channel information including resource block (RB), frequency bands, time periods, modulation coding schemes (MCS), allowable size of data for transmission, etc. The UE may determine to bypass (e.g., skip, avoid, cancel) transmission of padding data corresponding/responsive to the absence of content data remaining/available for the uplink configured grant, and may bypass the transmission (instead of transmitting padding data in the scheduled UL CG). The padding data may be random data, or data having a predetermined pattern without containing meaningful content (e.g., to use/occupy/honor the UL CG). If the padding data is transmitted using the UL CG in a radio link to a base station, the base station receiving the padding data in the scheduled UL CG may not determine or declare a radio link failure (RLF).

Advantageously, in accordance with some embodiments of the present systems and methods, transmission of padding data can be bypassed or omitted to achieve several benefits. In one example, the size of the content data for transmission can be less than the allocated or allowable size of the data of a plurality of UL CG scheduled by the base station for the UE. After the UE transmits the content data for the plurality of UL CGs (e.g., prior to using all of the plurality of UL CGs), the UE may add padding data (e.g., in the remaining UL CG(s)) to avoid the base station from determining or declaring RLF. However, transmission of such padding data not containing any meaningful/valid content may cause inefficient usage of frequency bands or channels, and/or may cause unnecessary power consumption. By omitting or bypassing transmission of the padding data (e.g., after the desired content data is completely transmitted using a subset of the UL CGs), communication resources (e.g., frequency bands or channels) can be saved and power consumption of the UE can be reduced.

In one approach, the UE may add an indicator to an end of content data (e.g., in or while using the UL CG to transmit the last portion of the content data) to indicate that no additional content data is provided for the UL CG and/or for the remaining UL CG(s). Hence, the base station receiving the indicator may not determine/declare RLF, despite receiving no transmission (e.g., of the padding data) in the remaining UL CG(s).

In one approach, the UE may determine or predict an amount of bypassing of transmissions for UL CGs, and compare the amount with a threshold value. The threshold value may be a trigger point or threshold number of UL CGs for which no UL transmission is sent by the UE and/or received/detected by a base station or a threshold number of discontinuous transmissions (DTX) to determine/decide/declare that RLF (between the UE and the base station) has occurred. Bypassing of transmissions for UL CGs may include bypassing transmissions of previous UL CGs and a predicted bypassing transmission of a current or pending UL CG. If the amount of bypassing of transmissions exceeds the threshold value, then the base station may determine that RLF has occurred (or potentially occurred). If the amount of bypassing of transmissions does not exceed the threshold value, then the base station may not determine that RLF has occurred (or potentially occurred). In one aspect, if the amount of bypassing does not exceed the threshold value, the UE may bypass transmission of padding data for a UL CG, as bypassing transmission of the padding data for the UL CG may not cause or invoke RLF. In one aspect, if the amount of bypassing does exceed the threshold value, the UE may transmit the padding data for the UL CG to avoid or prevent RLF from being determined (e.g., to avoid or prevent any process that is triggered by a RLF).

FIG. 1 illustrates an example wireless communication system 100. The wireless communication system 100 may include a base station 110 (also referred to as "a wireless communication node 110" or "a station 110") and one or more user equipments (UEs) 120 (also referred to as "wireless communication devices 120" or "terminal devices 120"). The base station 110 and the UEs 120 may communicate through wireless communication links 130A, 130B, 130C. The wireless communication link 130 may be a cellular communication link conforming to 3G, 4G, 5G or other cellular communication protocols. In one example, the wireless communication link 130 supports, employs or is based on an orthogonal frequency division multiple access (OFDMA). In one aspect, the UEs 120 are located within a geographical boundary with respect to the base station 110, and may communicate with or through the base station 110. In some embodiments, the wireless communication system 100 includes more, fewer, or different components than shown in FIG. 1. For example, the wireless communication system 100 may include one or more additional base stations 110 than shown in FIG. 1.

In some embodiments, the UE 120 may be a user device such as a mobile phone, a smart phone, a personal digital assistant (PDA), tablet, laptop computer, wearable computing device, etc. Each UE 120 may communicate with the base station 110 through a corresponding communication link 130. For example, the UE 120 may transmit data to a base station 110 through a wireless communication link 130, and receive data from the base station 110 through the wireless communication link 130. Example data may include audio data, image data, text, etc. Communication or transmission of data by the UE 120 to the base station 110 may be referred to as an uplink communication. Communication or reception of data by the UE 120 from the base station 110 may be referred to as a downlink communication.

In some embodiments, the UE 120A includes a wireless interface 122, a processor 124, a memory device 126, and one or more antennas 128. These components may be embodied as hardware, software, firmware, or a combination thereof. In some embodiments, the UE 120A includes more, fewer, or different components than shown in FIG. 1. For example, the UE 120A may include an electronic display and/or an input device. For example, the UE 120A may include additional antennas 128 and wireless interfaces 122 than shown in FIG. 1.

The antenna 128 may be a component that receives a radio frequency (RF) signal and/or transmits a RF signal through a wireless medium. The RF signal may be at a frequency between 200 MHz to 100 GHz. The RF signal may have packets, symbols, or frames corresponding to data for communication. The antenna 128 may be a dipole antenna, a patch antenna, a ring antenna, or any suitable antenna for wireless communication. In one aspect, a single antenna 128 is utilized for both transmitting the RF signal and receiving the RF signal. In one aspect, different antennas 128 are utilized for transmitting the RF signal and receiving the RF signal. In one aspect, multiple antennas 128 are utilized to support multiple-in, multiple-out (MIMO) communication.

The wireless interface 122 includes or is embodied as a transceiver for transmitting and receiving RF signals through one or more antennas 128. The wireless interface 122 may communicate with a wireless interface 112 of the base station 110 through a wireless communication link 130A. In one configuration, the wireless interface 122 is coupled to one or more antennas 128. In one aspect, the wireless interface 122 may receive the RF signal at the RF frequency received through antenna 128, and downconvert the RF signal to a baseband frequency (e.g., 0-1 GHz). The wireless interface 122 may provide the downconverted signal to the processor 124. In one aspect, the wireless interface 122 may receive a baseband signal for transmission at a baseband frequency from the processor 124, and upconvert the baseband signal to generate a RF signal. The wireless interface 122 may transmit the RF signal through the antenna 128.

The processor 124 is a component that processes data. The processor 124 may be embodied as field programmable gate array (FPGA), application specific integrated circuit (ASIC), a logic circuit, etc. The processor 124 may obtain instructions from the memory device 126, and execute the instructions. In one aspect, the processor 124 may receive downconverted data at the baseband frequency from the wireless interface 122, and decode or process the downconverted data. For example, the processor 124 may generate audio data or image data according to the downconverted data, and present an audio indicated by the audio data and/or an image indicated by the image data to a user of the UE 120A. In one aspect, the processor 124 may generate or obtain data for transmission at the baseband frequency, and encode or process the data. For example, the processor 124 may encode or process image data or audio data at the baseband frequency, and provide the encoded or processed data to the wireless interface 122 for transmission.

The memory device 126 is a component that stores data. The memory device 126 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 126 may be embodied as a non-transitory computer readable medium storing instructions executable by the processor 124 to perform various functions of the UE 120A disclosed herein. In some embodiments, the memory device 126 and the processor 124 are integrated as a single component.

In some embodiments, each of the UEs 120B . . . 120N includes similar components of the UE 120A to communicate with the base station 110. Thus, detailed description of duplicated portion thereof is omitted herein for the sake of brevity.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations. In some embodiments, the base station 110 includes a wireless interface 112, a processor 114, a memory device 116, and one or more antennas 118. These components may be embodied as hardware, software, firmware, or a combination thereof. In some embodiments, the base station 110 includes more, fewer, or different components than shown in FIG. 1. For example, the base station 110 may include an electronic display and/or an input device. For example, the base station 110 may include additional antennas 118 and wireless interfaces 112 than shown in FIG. 1.

The antenna 118 may be a component that receives a radio frequency (RF) signal and/or transmits a RF signal through a wireless medium. The antenna 118 may be a dipole antenna, a patch antenna, a ring antenna, or any suitable antenna for wireless communication. In one aspect, a single antenna 118 is utilized for both transmitting the RF signal and receiving the RF signal. In one aspect, different antennas 118 are utilized for transmitting the RF signal and receiving the RF signal. In one aspect, multiple antennas 118 are utilized to support multiple-in, multiple-out (MIMO) communication.

The wireless interface 112 includes or is embodied as a transceiver for transmitting and receiving RF signals through one or more antennas 118. The wireless interface 112 may communicate with a wireless interface 122 of the UE 120 through a wireless communication link 130. In one configuration, the wireless interface 112 is coupled to one or more antennas 118. In one aspect, the wireless interface 112 may receive the RF signal at the RF frequency received through antenna 118, and downconvert the RF signal to a baseband frequency (e.g., 0-1 GHz). The wireless interface 112 may provide the downconverted signal to the processor 114. In one aspect, the wireless interface 112 may receive a baseband signal for transmission at a baseband frequency from the processor 114, and upconvert the baseband signal to generate a RF signal. The wireless interface 112 may transmit the RF signal through the antenna 118.

The processor 114 is a component that processes data. The processor 114 may be embodied as FPGA, ASIC, a logic circuit, etc. The processor 114 may obtain instructions from the memory device 116, and execute the instructions. In one aspect, the processor 114 may receive downconverted data at the baseband frequency from the wireless interface 112, and decode or process the downconverted data. For example, the processor 114 may generate audio data or image data according to the downconverted data. In one aspect, the processor 114 may generate or obtain data for transmission at the baseband frequency, and encode or process the data. For example, the processor 114 may encode or process image data or audio data at the baseband frequency, and provide the encoded or processed data to the wireless interface 112 for transmission. In one aspect, the processor 114 may set, assign, schedule, or allocate communication resources for different UEs 120. For example, the processor 114 may set different modulation schemes, time slots, channels, frequency bands, etc. for UEs 120 to avoid interference. The processor 114 may generate data (or UL CGs) indicating configuration of communication resources, and provide the data (or UL CGs) to the wireless interface 112 for transmission to the UEs 120.

The memory device 116 is a component that stores data. The memory device 116 may be embodied as RAM, flash memory, ROM, EPROM, EEPROM, registers, a hard disk, a removable disk, a CD-ROM, or any device capable for storing data. The memory device 116 may be embodied as a non-transitory computer readable medium storing instructions executable by the processor 114 to perform various functions of the base station 110 disclosed herein. In some embodiments, the memory device 116 and the processor 114 are integrated as a single component.

In some embodiments, communication between the base station 110 and the UE 120 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
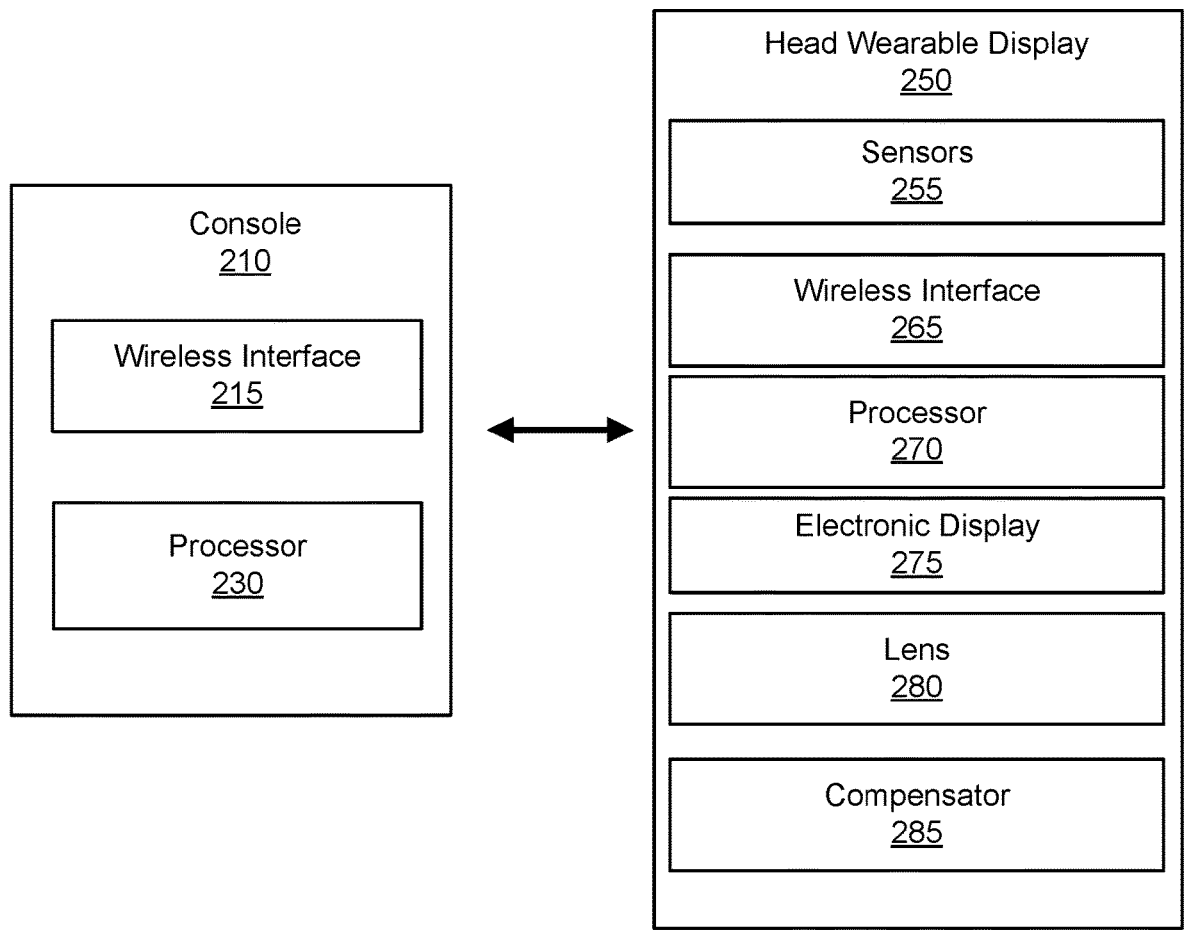
FIG. 2 is a diagram of a console and a head wearable display for presenting augmented reality or virtual reality, according to an example implementation of the present disclosure.

FIG. 2 is a block diagram of an example artificial reality system environment 200. In some embodiments, the artificial reality system environment 200 includes a HWD 250 worn by a user, and a console 210 providing content of artificial reality (e.g., augmented reality, virtual reality, mixed reality) to the HWD 250. Each of the HWD 250 and the console 210 may be a separate UE 120. The HWD 250 may be referred to as, include, or be part of a head mounted display (HMD), head mounted device (HMD), head wearable device (HWD), head worn display (HWD) or head worn device (HWD). The HWD 250 may detect its location and/or orientation of the HWD 250 as well as a shape, location, and/or an orientation of the body/hand/face of the user, and provide the detected location/or orientation of the HWD 250 and/or tracking information indicating the shape, location, and/or orientation of the body/hand/face to the console 210. The console 210 may generate image data indicating an image of the artificial reality according to the detected location and/or orientation of the HWD 250, the detected shape, location and/or orientation of the body/hand/face of the user, and/or a user input for the artificial reality, and transmit the image data to the HWD 250 for presentation. In some embodiments, the artificial reality system environment 200 includes more, fewer, or different components than shown in FIG. 2. In some embodiments, functionality of one or more components of the artificial reality system environment 200 can be distributed among the components in a different manner than is described here. For example, some of the functionality of the console 210 may be performed by the HWD 250. For example, some of the functionality of the HWD 250 may be performed by the console 210. In some embodiments, the console 210 is integrated as part of the HWD 250.

In some embodiments, the HWD 250 is an electronic component that can be worn by a user and can present or provide an artificial reality experience to the user. The HWD 250 may render one or more images, video, audio, or some combination thereof to provide the artificial reality experience to the user. In some embodiments, audio is presented via an external device (e.g., speakers and/or headphones) that receives audio information from the HWD 250, the console 210, or both, and presents audio based on the audio information. In some embodiments, the HWD 250 includes sensors 255, a wireless interface 265, a processor 270, an electronic display 275, a lens 280, and a compensator 285. These components may operate together to detect a location of the HWD 250 and a gaze direction of the user wearing the HWD 250, and render an image of a view within the artificial reality corresponding to the detected location and/or orientation of the HWD 250. In other embodiments, the HWD 250 includes more, fewer, or different components than shown in FIG. 2.

In some embodiments, the sensors 255 include electronic components or a combination of electronic components and software components that detect a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the sensors 255 include eye trackers. The eye trackers may include electronic components or a combination of electronic components and software components that determine a gaze direction of the user of the HWD 250. In some embodiments, the HWD 250, the console 210 or a combination of them may incorporate the gaze direction of the user of the HWD 250 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 250, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 250. In some embodiments, the eye trackers incorporate the orientation of the HWD 250 and the relative gaze direction with respect to the HWD 250 to determine a gate direction of the user. Assuming for an example that the HWD 250 is oriented at a direction 30 degrees from a reference direction, and the relative gaze direction of the HWD 250 is −10 degrees (or 350 degrees) with respect to the HWD 250, the eye trackers may determine that the gaze direction of the user is 20 degrees from the reference direction. In some embodiments, a user of the HWD 250 can configure the HWD 250 (e.g., via user settings) to enable or disable the eye trackers. In some embodiments, a user of the HWD 250 is prompted to enable or disable the eye trackers.

In some embodiments, the wireless interface 265 includes an electronic component or a combination of an electronic component and a software component that communicates with the console 210. The wireless interface 265 may be or correspond to the wireless interface 122. The wireless interface 265 may communicate with a wireless interface 215 of the console 210 through a wireless communication link through the base station 110. Through the communication link, the wireless interface 265 may transmit to the console 210 data indicating the determined location and/or orientation of the HWD 250, and/or the determined gaze direction of the user. Moreover, through the communication link, the wireless interface 265 may receive from the console 210 image data indicating or corresponding to an image to be rendered and additional data associated with the image.

In some embodiments, the processor 270 includes an electronic component or a combination of an electronic component and a software component that generates one or more images for display, for example, according to a change in view of the space of the artificial reality. In some embodiments, the processor 270 is implemented as a part of the processor 124 or is communicatively coupled to the processor 124. In some embodiments, the processor 270 is implemented as a processor (or a graphical processing unit (GPU)) that executes instructions to perform various functions described herein. The processor 270 may receive, through the wireless interface 265, image data describing an image of artificial reality to be rendered and additional data associated with the image, and render the image to display through the electronic display 275. In some embodiments, the image data from the console 210 may be encoded, and the processor 270 may decode the image data to render the image. In some embodiments, the processor 270 receives, from the console 210 in additional data, object information indicating virtual objects in the artificial reality space and depth information indicating depth (or distances from the HWD 250) of the virtual objects. In one aspect, according to the image of the artificial reality, object information, depth information from the console 210, and/or updated sensor measurements from the sensors 255, the processor 270 may perform shading, reprojection, and/or blending to update the image of the artificial reality to correspond to the updated location and/or orientation of the HWD 250. Assuming that a user rotated his head after the initial sensor measurements, rather than recreating the entire image responsive to the updated sensor measurements, the processor 270 may generate a small portion (e.g., 10%) of an image corresponding to an updated view within the artificial reality according to the updated sensor measurements, and append the portion to the image in the image data from the console 210 through reprojection. The processor 270 may perform shading and/or blending on the appended edges. Hence, without recreating the image of the artificial reality according to the updated sensor measurements, the processor 270 can generate the image of the artificial reality.

In some embodiments, the electronic display 275 is an electronic component that displays an image. The electronic display 275 may, for example, be a liquid crystal display or an organic light emitting diode display. The electronic display 275 may be a transparent display that allows the user to see through. In some embodiments, when the HWD 250 is worn by a user, the electronic display 275 is located proximate (e.g., less than 3 inches) to the user's eyes. In one aspect, the electronic display 275 emits or projects light towards the user's eyes according to image generated by the processor 270.

In some embodiments, the lens 280 is a mechanical component that alters received light from the electronic display 275. The lens 280 may magnify the light from the electronic display 275, and correct for optical error associated with the light. The lens 280 may be a Fresnel lens, a convex lens, a concave lens, a filter, or any suitable optical component that alters the light from the electronic display 275. Through the lens 280, light from the electronic display 275 can reach the pupils, such that the user can see the image displayed by the electronic display 275, despite the close proximity of the electronic display 275 to the eyes.

In some embodiments, the compensator 285 includes an electronic component or a combination of an electronic component and a software component that performs compensation to compensate for any distortions or aberrations. In one aspect, the lens 280 introduces optical aberrations such as a chromatic aberration, a pin-cushion distortion, barrel distortion, etc. The compensator 285 may determine a compensation (e.g., predistortion) to apply to the image to be rendered from the processor 270 to compensate for the distortions caused by the lens 280, and apply the determined compensation to the image from the processor 270. The compensator 285 may provide the predistorted image to the electronic display 275.

In some embodiments, the console 210 is an electronic component or a combination of an electronic component and a software component that provides content to be rendered to the HWD 250. In one aspect, the console 210 includes a wireless interface 215 and a processor 230. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 250 in a physical space into a virtual space (or simultaneous localization and mapping (SLAM) data), eye tracking data, motion vector information, depth information, edge information, object information, etc. The console 210 may provide the image data and the additional data to the HWD 250 for presentation of the artificial reality. In other embodiments, the console 210 includes more, fewer, or different components than shown in FIG. 2. In some embodiments, the console 210 is integrated as part of the HWD 250.

In some embodiments, the wireless interface 215 is an electronic component or a combination of an electronic component and a software component that communicates with the HWD 250. The wireless interface 215 may be or correspond to the wireless interface 122. The wireless interface 215 may be a counterpart component to the wireless interface 265 to communicate through a communication link (e.g., wireless communication link). Through the communication link, the wireless interface 215 may receive from the HWD 250 data indicating the determined location and/or orientation of the HWD 250, and/or the determined gaze direction of the user. Moreover, through the communication link, the wireless interface 215 may transmit to the HWD 250 image data describing an image to be rendered and additional data associated with the image of the artificial reality.

The processor 230 can include or correspond to a component that generates content to be rendered according to the location and/or orientation of the HWD 250. In some embodiments, the processor 230 is implemented as a part of the processor 124 or is communicatively coupled to the processor 124. In some embodiments, the processor 230 may incorporate the gaze direction of the user of the HWD 250. In one aspect, the processor 230 determines a view of the artificial reality according to the location and/or orientation of the HWD 250. For example, the processor 230 maps the location of the HWD 250 in a physical space to a location within an artificial reality space, and determines a view of the artificial reality space along a direction corresponding to the mapped orientation from the mapped location in the artificial reality space. The processor 230 may generate image data describing an image of the determined view of the artificial reality space, and transmit the image data to the HWD 250 through the wireless interface 215. In some embodiments, the processor 230 may generate additional data including motion vector information, depth information, edge information, object information, hand model data, etc., associated with the image, and transmit the additional data together with the image data to the HWD 250 through the wireless interface 215. The processor 230 may encode the image data describing the image, and can transmit the encoded data to the HWD 250. In some embodiments, the processor 230 generates and provides the image data to the HWD 250 periodically (e.g., every 11 ms).

In one aspect, the process of detecting the location of the HWD 250 and the gaze direction of the user wearing the HWD 250, and rendering the image to the user should be performed within a frame time (e.g., 11 ms or 16 ms). A latency between a movement of the user wearing the HWD 250 and an image displayed corresponding to the user movement can cause judder, which may result in motion sickness and can degrade the user experience. In one aspect, the HWD 250 and the console 210 can prioritize communication for augmented reality or virtual reality, such that the latency between the movement of the user wearing the HWD 250 and the image displayed corresponding to the user movement can be presented within the frame time (e.g., 11 ms or 16 ms) to provide a seamless experience.

Figure 3:
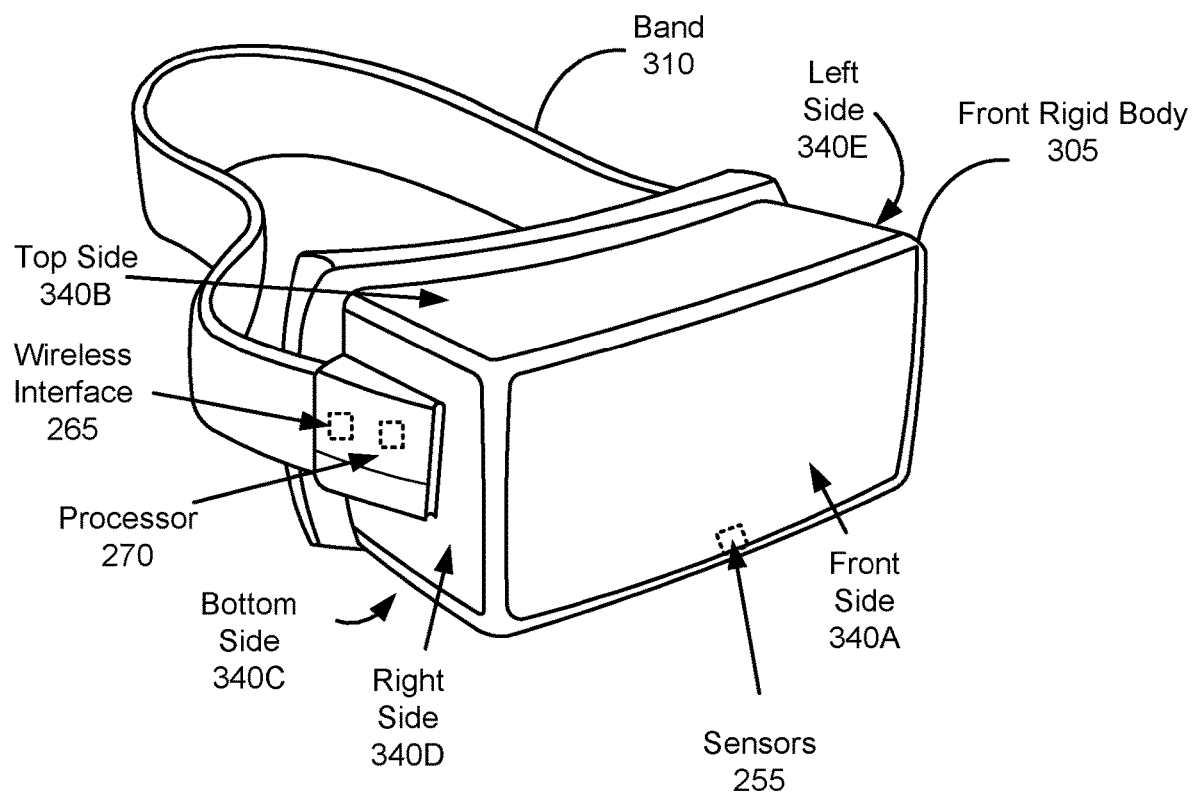
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the electronic display 275 (not shown in FIG. 3), the lens 280 (not shown in FIG. 3), the sensors 255, the wireless interface 265, and the processor 270. In the embodiment shown by FIG. 3, the wireless interface 265, the processor 270, and the sensors 255 are located within the front rigid body 205, and may not be visible externally. In other embodiments, the HWD 250 has a different configuration than shown in FIG. 3. For example, the wireless interface 265, the processor 270, and/or the sensors 255 may be in different locations than shown in FIG. 3.

Figure 4:
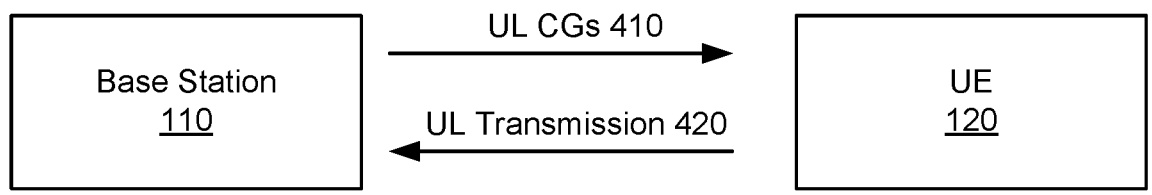
FIG. 4 is a diagram of an example wireless communication system illustrating a process of establishing an uplink communication between user equipment and a base station, according to an example implementation of the present disclosure.

FIG. 4 is a diagram of an example wireless communication system 400 illustrating a process of establishing an uplink communication between the user equipment 120 and the base station 110, according to an example implementation of the present disclosure. In one approach, the base station 110 determines a set of UL CGs 410, and transmits/communicates the set of UL CGs 410 to the UE 120 (e.g., to schedule and/or configure UL transmissions of the UE).

Each UL CG may indicate or specify channel information such as resource block (RB), frequency bands, time periods, modulation coding schemes (MCS), data size, etc., or an UL transmission of the UE. The processor 114 of the base station 110 may determine/generate/establish/configure the set of UL CGs 410, according to traffic characteristics, channel conditions, etc., between the UE and the base station for instance. The processor 114 of the base station 110 may cause the wireless interface 112 of the base station 110 to transmit/communicate the set of UL CGs 410 periodically (e.g., via radio resource configuration or medium access control element signaling), and/or upon request from the UE 120.

The processor 124 of the UE 120 may receive the set of UL CGs 410 through the wireless interface 122, and can store the set of UL CGs 410 with/in/using the memory device 126. The processor 124 may select one or more of the UL CGs and can perform an uplink transmission 420, according to the selected one or more UL CGs. For example, the processor 124 of the UE 120 may cause or configure the wireless interface 122 to transmit content data to the base station 110 through a channel or a frequency band during a time period indicated by the selected one or more UL CGs. The content data may be data containing content, such as text, audio, video, or miscellaneous information to be communicated from the UE 120 to the base station 110 for instance. For example, the processor 124 of the UE 120 may cause the wireless interface 122 to perform modulation to transmit the content data, according to MCS indicated by the selected one or more UL CGs. For example, the processor 124 of the UE 120 may generate or obtain content data for transmission, the content data having a size less than an allowable size of data of the one or more UL CGs.

In one implementation, the processor 124 of the UE 120 may add padding data to the content data for transmission. For example, the size of the content data for transmission can be less than the allocated or allowable size of the data of the one or more UL CGs. At or after an end of the content data, the processor 124 of the UE 120 may add padding data to avoid the base station 110 from determining or declaring RLF. The padding data may be random data, or data having a predetermined pattern/value(s) without containing meaningful content. The processor 124 of the UE 120 may cause the wireless interface 122 to transmit the content data and the padding data to the base station 110. In some embodiments, the padding data is added to the last portion of the content data, and is transmitted using one of the one or more UL CGs. Padding data may, in some implementations, be transmitted in remaining UL CG(s) (e.g., that does not carry any portion of the content data). In response to receiving the padding data, the base station 110 may not determine RLF or may not declare RLF. However, transmission of such padding data not containing any content may cause inefficient usage of frequency bands or channels, and may cause unnecessary power consumption.

In one aspect, the processor 124 of the UE 120 may determine an absence of content data remaining to transmit to the base station 110 for a selected UL CG. For example, if a media access control protocol data unit (MAC PDU) of the uplink configured grant includes an amount of null data that meets a threshold amount (e.g., is over 90%) or includes only the null data, then the processor 124 of the UE 120 may determine that there is an absence of content data remaining to transmit to the base station 110 for the selected UL CG. The processor 124 of the UE 120 may determine to bypass transmission of a padding data corresponding to the absence of content data remaining for the selected UL CG. For example, the processor 124 of the UE 120 may bypass generating the padding data corresponding/responsive to the absence of the content data remaining for the selected UL CG. In one approach, the processor 124 of the UE 120 may add/append an indicator to an end of content data (e.g., in a last frame or packet carrying the last portion of content data, or a frame or packet following the latter) for a UL CG. The indicator can be in a header (e.g., medium access control header), for instance in a reserved bit or field of the header. The indicator may indicate that no additional content data is provided for the UL CG. The indicator may be a single bit or one more bits. The processor 114 of the base station 110 receiving the indicator may not determine or may not declare RLF, despite no transmission of the padding data from the UE 120.

In one approach, the processor 124 of the UE 120 may determine to selectively bypass uplink transmission. For example, the processor 124 of the UE 120 may determine or predict a number of DTX and/or an amount of bypassing of transmissions for UL CGs, and compare the amount with a threshold value. For example, the processor 124 of the UE 120 may keep track of or determine a number of DTX and/or a size of data not transmitted due to bypassed transmissions of previous UL CGs within a time period. As an example, the processor 124 of the UE 120 may obtain an amount of bypassing by adding i) the size of data not transmitted due to bypassed transmissions of previous UL CGs within a time period and ii) a size of data predicted to be bypassed or omitted from transmission for a current or pending UL CG. If the number of DTX, and/or the amount of bypassing exceeds a threshold value, then the processor 114 of the base station 110 may determine or declare RLF. If the number of DTX, and/or the amount of bypassing does not exceed the threshold value, then the processor 114 of the base station 110 may not determine or declare the RLF. In one aspect, if the amount of bypassing does not exceed the threshold value, the processor 124 of the UE 120 may cause the wireless interface 122 to bypass transmission of padding data for a UL CG, as bypassing transmission of the padding data for the UL CG may not cause or invoke RLF. In one aspect, if the number of DTX, and/or the amount of bypassing does exceed the threshold value, the processor 124 of the UE 120 may generate the padding data and cause the wireless interface 122 to transmit the padding data for the UL CG to avoid or prevent RLF.

Advantageously, transmission of padding data can be bypassed, skipped, suppressed or omitted to achieve several benefits. In particular, selectively bypassing transmission of padding data can be advantageous to augmented reality or virtual reality applications. For example, audio data or image data of augmented reality or virtual reality may be generated or updated, according to a location and a gaze direction of a device (or UE 120), and may dynamically change depending on the movement of the device (or UE 120). Communication of such dynamically changing data of the augmented reality or the virtual reality based on a UL CG may be inadequate or inefficient, e.g., if multiple UL CGs are scheduled, more than are needed/utilized to communicate content data of the augmented reality or the virtual reality. For example, when there is not a large user movement, an uplink transmission may be provided with a small portion (e.g., less than 10%) of allowable size of data of the UL CG including content data, and the rest of the portion of the allowable size of data of the UL CG including padding data. Transmission of such a large portion of padding data may be wasteful in terms of communication resources (e.g., frequency band) and power consumption of the device (e.g., UE 120). By selectively omitting or bypassing transmission of the padding data, communication resources (e.g., frequency bands or channels) can be saved, and power consumption of the UE 120 can be reduced.

Figure 5:
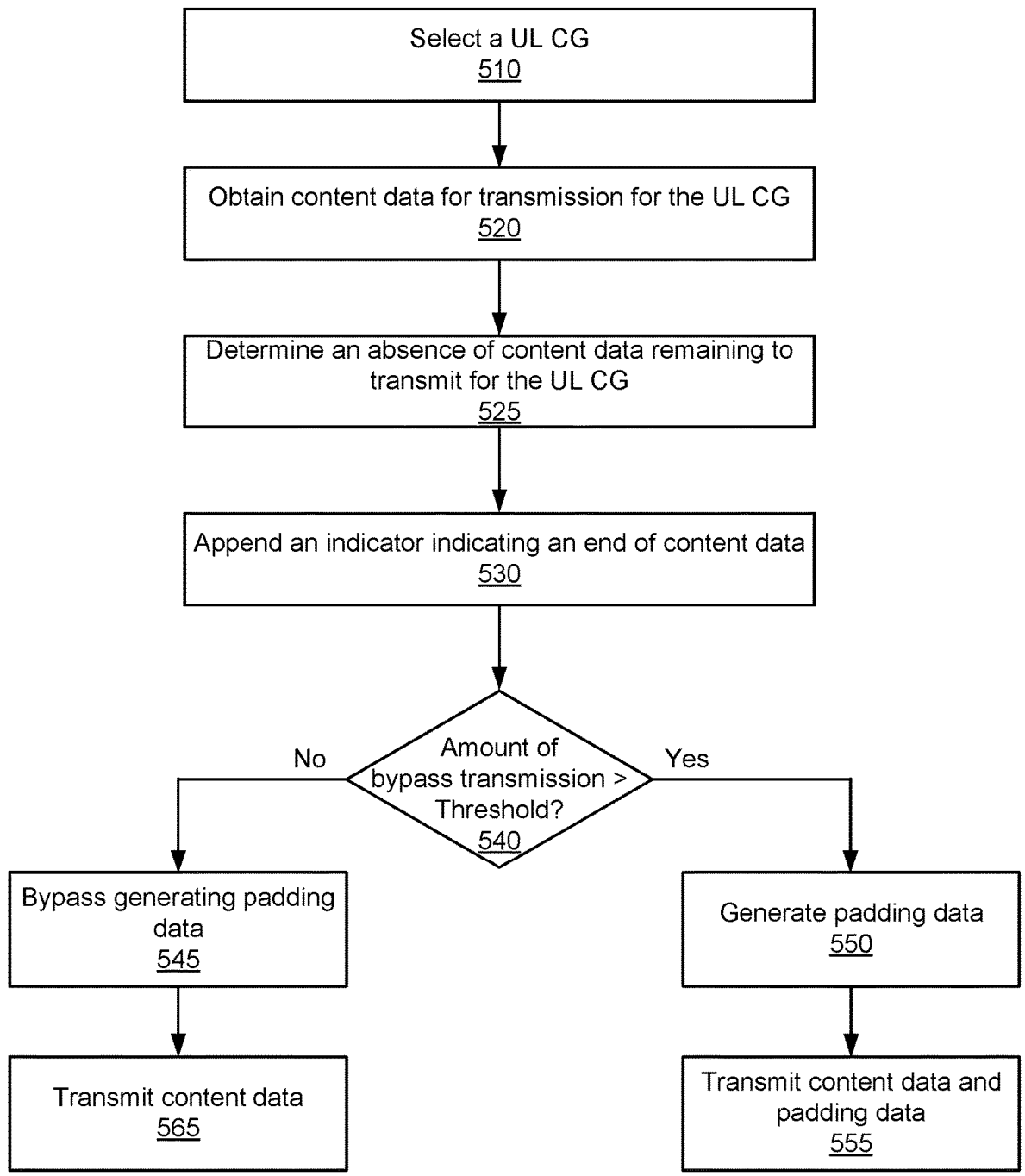
FIG. 5 is a flowchart showing a process of providing uplink transmission, according to an example implementation of the present disclosure.

FIG. 5 is a flowchart showing a process 500 of providing uplink transmission, according to an example implementation of the present disclosure. In some embodiments, the process 500 is performed by the UE 120 (or HWD 250 or console 210). In some embodiments, the process 500 is performed by other entities. In some embodiments, the process 500 includes more, fewer, or different steps than shown in FIG. 5. For example, step 530 can be omitted, in some embodiments. For example, steps 540, 550, and 555 may be omitted, in some embodiments.

In one approach, the UE 120 selects 510, from a set of UL CGs, an UL CG. The UE 120 may select, from the set of UL CGs, one or more UL CGs for uplink transmission based on various factors or conditions. For example, the UE 120 may select the UL CG, according to traffic priority, data amount, delay budget, reliability, power condition or thermal condition of the UE 120, and channel condition, or any combination of them.

In one approach, the UE 120 obtains 520 content data for uplink transmission for the selected UL CG. The content data may be data containing content, such as text, audio, video, or miscellaneous information. The UE 120 may obtain or generate content data having a size being at least a predetermined percentage of the allowable size of the UL CG. Accordingly, an uplink transmission can be performed with/using at least the predetermined percentage of the allowable size of the UL CG to avoid occupying or wasting the channel with padding data.

In one approach, the UE 120 determines 525 or detects an absence of content data remaining to transmit for/using the UL CG. For example, if a media access control protocol data unit (MAC PDU) of the uplink configured grant includes an amount of null data (e.g., data that is not content data) over a threshold amount (e.g., 90%) or includes only the null data, then the processor 124 of the UE 120 may determine the absence of content data remaining to transmit to the base station 110 for the selected UL CG.

In one approach, the UE 120 appends 530 or adds an indicator indicating an end of the content data, to an end of content data for a UL CG. The indicator may indicate that no additional content data is provided for the UL CG. The indicator may be a single bit or one or more bits. The base station 110 receiving the indicator may not determine or may not declare that RLF has occurred, despite no transmission of padding data from the UE 120.

In one approach, the UE 120 may determine to selectively bypass uplink transmission. For example, the UE 120 may determine or predict a number of DTX and/or an amount of bypassing of transmissions for UL CGs, and compare 540 the amount with a threshold value. For example, the UE 120 may keep track of or determine a number of DTX and/or a size of data not transmitted due to bypassed transmissions of previous UL CGs within a time period, and may for instance obtain an amount of bypassing by adding i) the size of data not transmitted due to bypassed transmissions of previous UL CGs within a time period and ii) the size of data predicted to be bypassed or omitted from transmission for a current or pending UL CG (e.g., difference between the allowable size of transmission for UL CG and the size of the content data for the UL CG). If the number of DTX and/or the amount of bypassing exceeds a threshold value, then the base station 110 may determine that RLF has occurred. If the amount of bypassing does not exceed the threshold value, then the base station 110 may not determine/declare the RLF (and may not initiate a remedial process in response to the RLF).

In one aspect, if the number of DTX and/or the amount of bypassing does not exceed the threshold value, the UE 120 may bypass 545 generating the padding data, and can transmit 565 the content data to the base station 110 without padding data, as the bypassing transmission of the padding data for the UL CG may not cause or invoke RLF.

In one aspect, if the amount of bypassing does exceed the threshold value, the UE 120 may generate 550 the padding data, and can transmit 555 the content data and the padding data to the base station 110 to avoid or prevent RLF.

Advantageously, transmission of padding data can be bypassed or omitted to achieve several benefits. In particular, selectively bypassing transmission of padding data is beneficial to augmented reality or virtual reality applications. For example, audio data or image data of augmented reality or virtual reality may be generated or updated, according to a location and a gaze direction of a device (or UE 120), and may dynamically change depending on the movement of the device (or UE 120). Communication of such dynamically changing data of the augmented reality or the virtual reality based on a UL CG may be inadequate or inefficient if all or multiple UL CGs are utilized or consumed to transmit padding data. For example, when there is not a large user movement, an uplink transmission may be provided with a small portion (e.g., less than 10%) of allowable size of data of the UL CG(s) including content data, and the rest of the portion of the allowable size of data of the UL CG(s) including padding data. Transmission of such large portion of padding data may be wasteful in terms of communication resources (e.g., frequency band) and power consumption of the device (e.g., UE 120). By selectively omitting or bypassing transmission of the padding data, communication resources (e.g., frequency bands or channels) can be saved, and power consumption of the UE 120 can be reduced.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A communication device comprising:
    a wireless interface; and
    a processor coupled to the wireless interface, the processor configured to:
        determine an absence of content data remaining to transmit to a base station for an uplink configured grant,
        cause the wireless interface to bypass transmission of padding data for the uplink configured grant, responsive to the absence of the content data remaining for the uplink configured grant,
        append, to additional content data for another uplink configured grant, an indicator indicating an end of the additional content data, and
        cause the wireless interface to transmit, to the base station, the additional content data with the indicator appended.

2. The communication device of claim 1,
    wherein the base station receiving the indicator is configured to bypass determining an absence of receiving the padding data for the uplink configured grant, as a radio link failure, in response to the indicator.

3. The communication device of claim 1, wherein the processor is configured to:
    determine an amount of bypassing of transmissions for uplink configured grants; and
    compare the amount of bypassing of transmissions against a threshold value,
    wherein the processor is configured to cause the wireless interface to bypass the transmission of the padding data, responsive to the absence of the content data remaining for the uplink configured grant, and to the amount of bypassing of transmissions being less than the threshold value.

4. The communication device of claim 3, wherein the processor is configured to determine an amount of content data allocated for the another uplink configured grant, and to add padding data to the additional content data to meet the amount of content data allocated for the another uplink configured grant.

5. The communication device of claim 1, wherein the processor is configured to determine the absence of the content data remaining to transmit to the base station for the uplink configured grant by:
    determining that a media access control protocol data unit (MAC PDU) of the uplink configured grant includes an amount of null data meeting a threshold amount.

6. A method comprising:
    determining, by a user equipment (UE), an absence of content data remaining to transmit to a base station for an uplink configured grant;
    bypassing, by the UE, transmission of padding data for the uplink configured grant, responsive to the absence of the content data remaining for the uplink configured grant;
    appending, by the UE to additional content data for another uplink configured grant, an indicator indicating an end of the additional content data; and
    causing, by the UE, the wireless interface to transmit, to the base station, the additional content data with the indicator appended.

7. The method of claim 6, wherein the base station receiving the indicator bypasses determining an absence of receiving the padding data for the uplink configured grant, as a radio link failure, in response to the indicator.

8. The method of claim 6, further comprising:
    determining, by the UE, an amount of bypassing of transmissions for uplink configured grants; and
    comparing, by the UE, the amount of bypassing of transmissions against a threshold value,
    wherein the UE bypasses the transmission of the padding data, responsive to the absence of the content data remaining for the uplink configured grant, and to the amount of bypassing of transmissions being less than the threshold value.

9. The method of claim 8, further comprising:
    determining, by the UE, an amount of content data allocated for the another uplink configured grant; and
    adding, by the UE, padding data to the additional content data to meet the amount of content data allocated for the another uplink configured grant.

10. The method of claim 6, wherein determining, by the UE, the absence of the content data remaining for the uplink configured grant includes:
    determining, by the UE, that a media access control protocol data unit (MAC PDU) of the uplink configured grant includes an amount of null data meeting a threshold amount.

11. A non-transitory computer readable medium storing instructions when executed by one or more processors cause the one or more processors to:
    determine, an absence of content data remaining to transmit to a base station for an uplink configured grant;
    cause a wireless interface to bypass transmission of padding data for the uplink configured grant, responsive to the absence of the content data remaining for the uplink configured grant;
    append, to additional content data for another uplink configured grant, an indicator indicating an end of the additional content data; and
    cause the wireless interface to transmit, to the base station, the additional content data with the indicator appended.

12. The non-transitory computer readable medium of claim 11, wherein the base station receiving the indicator bypasses determining an absence of receiving the padding data for the uplink configured grant, as a radio link failure, in response to the indicator.

13. The non-transitory computer readable medium of claim 11, further storing instructions when executed by the one or more processors cause the one or more processors to:
    determine an amount of bypassing of transmissions for uplink configured grants; and
    compare the amount of bypassing of transmissions against a threshold value,
    wherein the one or more processors cause the wireless interface to bypass the transmission of the padding data, responsive to the absence of the content data remaining for the uplink configured grant, and to the amount of bypassing of transmissions being less than the threshold value.

14. The non-transitory computer readable medium of claim 13, further storing instructions when executed by the one or more processors cause the one or more processors to:
   determine an amount of content data allocated for the another uplink configured grant, and to add padding data to the additional content data to meet the amount of content data allocated for the another uplink configured grant.

15. The non-transitory computer readable medium of claim 11, wherein the instructions when executed by the one or more processors that cause the one or more processors to determine the absence of the content data remaining to transmit to the base station for the uplink configured grant include instructions when executed by the one or more processors cause the one or more processors to:
   determine that a media access control protocol data unit (MAC PDU) of the uplink configured grant includes an amount of null data meeting a threshold amount.

\* \* \* \* \*